United States Patent
Colafrancesco et al.

(10) Patent No.: US 11,445,107 B2
(45) Date of Patent: Sep. 13, 2022

(54) SUPERVISED SETUP FOR CONTROL DEVICE WITH IMAGER

(71) Applicant: 7hugs Labs SAS, Montrouge (FR)

(72) Inventors: Julien Colafrancesco, Paris (FR); Simon Tchedikian, Issy-les-moulineaux (FR); Simon Guillot, Nantes (FR); Louis Xiao Wang, Sceaux (FR)

(73) Assignee: Qorvo US, Inc., Greensboro, NC (US)

( * ) Notice: Subject to any disclaimer, the term of this patent is extended or adjusted under 35 U.S.C. 154(b) by 0 days.

(21) Appl. No.: 16/987,776

(22) Filed: Aug. 7, 2020

(65) Prior Publication Data
US 2021/0044741 A1    Feb. 11, 2021

Related U.S. Application Data (60) Provisional application No. 62/884,278, filed on Aug. 8, 2019.

(51) Int. Cl.
| | |
|---|---|
| *H04N 5/232* | (2006.01) |
| *G06F 3/033* | (2013.01) |
| *G06F 3/0487* | (2013.01) |
| *G06T 1/00* | (2006.01) |
| *G06V 20/20* | (2022.01) |

(52) U.S. Cl.
CPC ......... *H04N 5/23222* (2013.01); *G06F 3/033* (2013.01); *G06F 3/0487* (2013.01); *G06T 1/0014* (2013.01); *G06V 20/20* (2022.01); *H04N 5/232945* (2018.08); *G08C 2201/32* (2013.01)

(58) Field of Classification Search
CPC ......... H04N 5/23222; H04N 5/232945; G06F 3/033; G06F 3/0487; G06K 9/00671; G06T 1/0014; G08C 2201/32; G08C 23/04; G08C 2201/70; G08C 2201/20; G06V 20/20
See application file for complete search history.

(56) References Cited

U.S. PATENT DOCUMENTS

| | | | |
|---|---|---|---|
| 8,537,231 B2 | 9/2013 | Mekenkamp et al. | |
| 8,594,632 B1 * | 11/2013 | Azizi | H04W 8/005 |
| | | | 455/411 |

(Continued)

FOREIGN PATENT DOCUMENTS

| | | |
|---|---|---|
| EP | 3214536 A1 | 9/2017 |
| WO | 2004047011 A2 | 6/2004 |
| WO | 2006079939 A2 | 8/2006 |

OTHER PUBLICATIONS

International Search Report and Written Opinion dated Nov. 3, 2020 from International Application No. PCT/B2020/057519, 10 pages.

*Primary Examiner* — Grant Sitta
(74) *Attorney, Agent, or Firm* — Withrow & Terranova, P.L.L.C.

(57) ABSTRACT

Systems and methods associated with determining a pointing target of pointing device are disclosed. One embodiment disclosed herein is a method conducted with a control device having a pointing direction and an onboard imager. The field of view of the onboard imager includes the pointing direction. The method includes capturing a reference image, determining a characteristic quantity based on the reference image, generating a feedback message based on the characteristic quantity, and predicating a setup phase termination for the control device on the characteristic quantity.

29 Claims, 4 Drawing Sheets

(56) References Cited

U.S. PATENT DOCUMENTS

| | | | | |
|---|---|---|---|---|
| 8,624,713 B2* | 1/2014 | Van Vleck | ............ | H04L 12/281 340/12.28 |
| 8,836,487 B2* | 9/2014 | Shin | ............ | G08C 17/02 345/158 |
| 9,129,516 B2* | 9/2015 | Pratt | ............ | G08C 23/04 |
| 9,355,557 B2* | 5/2016 | Hong | ............ | G08C 19/00 |
| 9,367,144 B2* | 6/2016 | Oztaskent | ............ | G06F 3/033 |
| 9,465,450 B2* | 10/2016 | Cortenraad | ............ | G06F 3/0346 |
| 9,843,831 B2* | 12/2017 | Mangla | ............ | H04N 21/4332 |
| 9,881,191 B2* | 1/2018 | Wang | ............ | G06K 7/10881 |
| 9,906,949 B2* | 2/2018 | Lynch | ............ | H04L 67/16 |
| 10,048,782 B2* | 8/2018 | Park | ............ | H04N 21/4223 |
| 10,101,827 B2* | 10/2018 | Peng | ............ | G06F 3/0489 |
| 10,218,834 B2* | 2/2019 | Ham | ............ | G08C 23/04 |
| 10,331,228 B2* | 6/2019 | Wilson | ............ | G08C 17/00 |
| 10,613,498 B2* | 4/2020 | Zhang | ............ | H04M 1/72415 |
| 10,636,288 B2* | 4/2020 | Arling | ............ | G08C 17/02 |
| 10,958,963 B2* | 3/2021 | Satheesh | ............ | H04N 21/43635 |
| 2004/0121725 A1* | 6/2004 | Matsui | ............ | G08C 17/02 455/3.06 |
| 2004/0208588 A1* | 10/2004 | Colmenarez | ............ | H04B 1/202 398/115 |
| 2005/0034160 A1* | 2/2005 | Kim | ............ | H04N 21/43632 725/80 |
| 2006/0168618 A1* | 7/2006 | Choi | ............ | G06F 3/005 725/37 |
| 2006/0227997 A1* | 10/2006 | Au | ............ | G08B 13/19682 382/103 |
| 2007/0080845 A1* | 4/2007 | Amand | ............ | G08C 19/28 341/176 |
| 2007/0096283 A1* | 5/2007 | Ljung | ............ | H04N 21/6547 257/686 |
| 2007/0271267 A1* | 11/2007 | Lim | ............ | G08C 19/28 |
| 2009/0285443 A1* | 11/2009 | Camp, Jr. | ............ | G08C 19/00 382/100 |
| 2014/0013100 A1* | 1/2014 | Menzel | ............ | H04N 21/43637 713/150 |
| 2016/0035141 A1 | 2/2016 | Suto et al. | | |
| 2016/0037573 A1* | 2/2016 | Ko | ............ | G06F 3/012 455/41.2 |
| 2016/0063854 A1 | 3/2016 | Burton et al. | | |
| 2017/0048901 A1* | 2/2017 | Finch | ............ | H04W 12/50 |
| 2017/0091551 A1 | 3/2017 | Zhang et al. | | |
| 2017/0163438 A1* | 6/2017 | Gary, Jr. | ............ | H04L 67/125 |
| 2017/0213449 A1 | 7/2017 | Tchedikian | | |
| 2017/0249745 A1* | 8/2017 | Fiala | ............ | A63F 13/213 |
| 2017/0311368 A1* | 10/2017 | Kandur Raja | ............ | H04W 76/14 |
| 2017/0344223 A1* | 11/2017 | Holzer | ............ | G06T 15/205 |
| 2018/0101284 A1* | 4/2018 | Pope | ............ | H04N 21/42204 |
| 2018/0151060 A1* | 5/2018 | Griffin | ............ | G06F 16/29 |
| 2018/0322774 A1* | 11/2018 | Wang | ............ | G08C 23/04 |
| 2018/0336396 A1* | 11/2018 | Harrison | ............ | G06K 9/00577 |
| 2019/0235641 A1* | 8/2019 | Goldberg | ............ | G06T 7/74 |
| 2019/0266886 A1* | 8/2019 | Jiang | ............ | G06F 16/58 |
| 2019/0346914 A1 | 11/2019 | Fukuchi et al. | | |
| 2019/0391716 A1* | 12/2019 | Badr | ............ | G06F 3/011 |

\* cited by examiner

SUPERVISED SETUP FOR CONTROL DEVICE WITH IMAGER

CROSS-REFERENCE TO RELATED APPLICATIONS

This application claims the benefit of U.S. Provisional Patent Application No. 62/884,278, filed Aug. 8, 2019, which is incorporated by reference herein in its entirety for all purposes.

BACKGROUND

Consumers intuitively align remote controls with the devices they intend to interact with by pointing the remote control at the device. This pattern of behavior stems from the fact that traditional remote controls directly transmitted a radio signal in the pointing direction of the remote control. Aligning the pointing direction of the remote with the device therefore gave the radio signal the best chance of reaching the intended target.

More recently, remote controls such as those using the techniques described in U.S. Pat. No. 10,068,463 determine a device to which a command will be delivered via one system, while the command itself is sent through alternative means. For example, a set of beacons could determine the pointing direction of the remote control, while a separate radio system routed commands indirectly from the remote control to the controllable device. These approaches preserve the traditional user experience pattern of pointing at a controllable device while expanding the universe of devices that can receive commands from the remote. However, the devices now require the system to identify where the pointing device is pointing so that the commands can be routed to the appropriate device.

There are different approaches available for identifying the position and orientation of an object. For example, the position and orientation of an object can be determined using geolocation such as through GPS. However, GPS is not quite precise enough to allow for an accurate determination of pointing direction, especially not in indoor environments and for the purpose of distinguishing whether the pointing direction corresponds with one of two device that are near each other. An alternative to GPS is an indoor positioning system with different beacons, such as those alluded to above, that use locally generated wireless signals to estimate the position of an object. However, placement constraints on these beacons can make installation costly and complex.

SUMMARY

Systems and methods that determine the pointing target of a pointing device using an onboard imager located on the object are disclosed. The pointing device can have a shape that defines a natural pointing direction of the pointing device. For example, the device could be a rectangle with a distinguished short edge where the long side of the rectangle and distinguishing features of that short edge naturally indicated the pointing direction of the object. More generally, the pointing device can have a pointing direction. For example, the device could be a disc with a pointing direction indicated by an arrow icon on the surface of the device. In other examples, any indicator which allowed a person to determine which way to point a device could be considered as providing the device with a pointing direction as that term is used herein. The onboard imager can be aligned with the pointing direction of the object. The onboard imager can be attached to an exterior of the pointing device or serve as an integral component of the pointing device. The onboard imager can have a field of view. The onboard imager can be oriented such that the field of view includes the pointing direction.

The systems disclosed herein can be the pointing device itself, but could alternatively also include supporting devices, such as a base or charger for the pointing device, and remote devices such as a server or cloud architecture in operative communication with those supporting devices or the pointing device. Throughout this disclosure reference will be made to non-transitory computer readable media storing instructions to allow the disclosed systems to conduct certain actions. In these embodiments, the computer readable media can all be internal to the pointing device, can be distributed across the supporting devices, remote device, and the pointing device, or they can be entirely located on the supporting devices and/or remote devices.

In specific embodiments of the invention, the pointing device can be a control device. The pointing device can be a remote control for selecting pointing targets in the form of controllable objects, or communication objects generally. Pointing the pointing device at a specific pointing target could form an association between the controllable or communication object and a routing system. The association could then be used to route commands to the currently associated controllable objects or communications from the currently associated communication object. For example, if the object where a controllable object such as a television, commands obtained from a user on the pointing device could be routed to the controllable object while the association was maintained. As another example, if the object were a communication object such as a weather service on a remote server, communications obtained from the remote server could be routed to the pointing device while the association was maintained. In this manner, a user could receive communications from and send command to various objects based on where the pointing device was pointing at any given time.

The object association formed by pointing the pointing device at a given target could also be used to alter a user interface by presenting controls on that interface for the currently associated object. The user interface could be provided on the pointing device. For example, the pointing device could include a touch display, and controls for the currently associated controllable object could be presented on the touch display when the association was formed. When the user pointed the pointing device at a television, the touch display could show a channel and volume control interface for the television. When the user turned the device to point at a light, the touch display could show a brightness control interface for the light.

The associations described above can be defined ex ante via a setup procedure. The system can be described as operating in a setup phase during the execution of the setup procedure. The setup procedure can involve associating a zone of interest with a pointing target and defining a signature for a zone of interest. The physical zones could be specific volumes of space within a physical location, such as the portion of a room in the vicinity of a television, or specific surfaces such as walls, ceilings, floors, or interfaces thereof. The pointing target could be the center of the zone of interest. For example, the pointing target could be a small device such as a DVR or compact streaming box, and the zone of interest could be a cabinet and surrounding area on which the small device was placed. The setup procedure could associate the zone of interest with the pointing target and furthermore associate the pointing target with a controllable object or communication object. Usage of the pointing device would then involve recognizing the signature for the zone of interest, recalling which pointing target was associated with that zone of interest, recalling what controllable object or communication object was associated with that pointing target, and forming the association with the object for the routing system. This phase of operation for the system can be referred to an operational phase. The various nodes of the system can be referred to as being in a deployed state during the operational phase.

Figure 1:
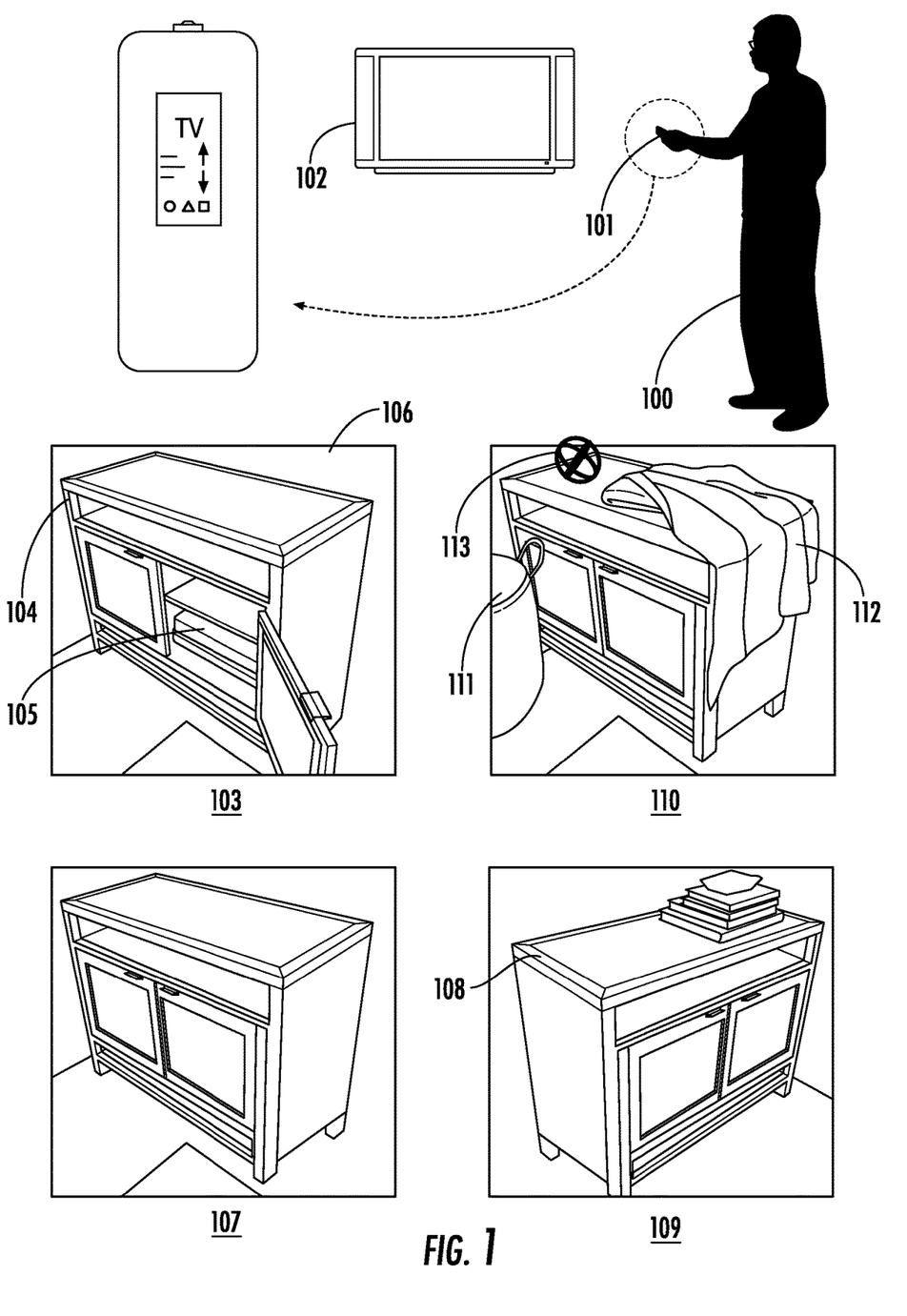
FIG. 1 illustrates a user with a pointing device and a set of images captured by an onboard imager located on the pointing device in accordance with specific embodiments disclosed herein.

In specific embodiments of the invention, the system can determine a pointing target of the pointing device using images captured by the imager. The images can be applied to a system which can recognize a signature of a zone of interest using those images. The pointing target could be the center of the zone of interest. FIG. 1 provides an example of a user 100 pointing a pointing device 101 at a piece of audio/visual (A/V) equipment 102 as an example of a user attempting to form an association between a controllable object and a pointing device. In this example, an imager aligned with the pointing device 101 could then capture an image of the A/V equipment 102. FIG. 1 provides the example of image 103 with a receiver 105 inside a cabinet 104 serving as the A/V equipment 102. The system could then operate on image 103 to recognize a signature of the zone of interest 106. In this case, the zone of interest could include the entire corner of the room occupied by cabinet 104. Assuming zone of interest 106 had previously been associated with cabinet 104 (the pointing target) and cabinet 104 has previously been associated with receiver 105 (the controllable object), the overall control system could then form an association with receiver 105 and route commands to receiver 105 based on this determination. As stated, the pointing target and the controllable device do not need to be the same. Instead, a user may be able to associate a specific zone in any given area with a specific controllable device (i.e., a window of a room could be associated with a weather service on a remote server). In the illustrated example, the imager could obtain image 107 in which only the cabinet 104 was visible, but the system would still understand that when the zone 106 is being pointed at, commands should be routed to receiver 105.

Detecting a pointing target to associate with a pointing device at any given time can be difficult for several reasons. For example, small pointing targets such as compact streaming boxes can be difficult to detect in an image taken of a general area. Furthermore, locales can include numerous identical copies of the same controllable device such as multiple versions of a home automation assistant or home stereo system. Distinguishing between the two devices, just based on recognizing the device alone, can be near impossible for an image recognition system as the devices are identical copies of a single design. Furthermore, locales such as homes often include multiple matching furniture pieces and other repetitive design elements on the walls, floors, and ceilings that could appear to be the same for an image recognition system. Furthermore, a region of a given locale can appear very different at different times owing to changes in luminosity, changes in perspective of the pointing device, variations in the spatial configuration of the objects in the region, and the introduction or removal of objects into the region.

In specific embodiments of the invention, the focus on a zone of interest as opposed to a pointing target helps to alleviate many of the concerns identified in the prior paragraph. A zone of interest will include additional information and signal from which a signature can be derived. This additional, stronger, signal can, for example, prevent a system from confusing cabinet 108 in image 109 with identical cabinet 104. This is because the zone of interest can include additional information in the form of which corner of the room the cabinet is located in that would be hidden if only the characteristics of the cabinet were used to generate a signature. Specific aspects of these embodiments which enhance the ability of the system to gather information regarding a zone of interest as opposed to a specific pointing target are described in the detailed description below.

In specific embodiments of the invention, the concerns identified in the prior paragraph are alleviated by building a robust signature creation and detection system for identifying a pointing target of a pointing device. In these embodiments, the signature creation process involves the collection of variant images of the same zone of interest. The variant images collected during the setup phase are referred to herein as reference images because they provide a reference for later recognition of the signature of the zone of interest. The signature creation process can be executed during a setup phase of the system and can be designed to assure that the variant images are highly disparate to enhance the strength of the signature. The images could be selected to vary in terms of the viewpoint from which they are captured, the luminosity conditions by which the are captured, the configuration of the zone of interest itself during image capture, and other variations. Variability of the images used to create the signature during a setup phase will thereby create a signature that can be recognized despite the variabilities mentioned above in the images when the system is deployed. For example, a system with a robust signature would still be able to recognize zone of interest 106 when provided with image 110 even though the cabinet 104 is partially covered by items 111, 112, and 113 that modify the appearance of the zone. The robust signature would have a high enough signal to noise ratio that the introduction of noise represented by these items would not cause the signature detection system to fail.

In specific embodiments of the invention, a user can be relied on to capture reference images used to generate signatures for the zones of interest that will be recognized during operation of the pointing device. However, in practice, there is nothing that guarantees that the reference images a user may take will be sufficient for the system to work correctly when deployed. For example, the user may not take enough images, may take multiple identical images and therefore not add any useful information, may take perturbed images (e.g., occluded images with an object temporarily present in the field of view), may take blurry images (e.g., by moving an imager too fast when a reference image is captured), or take images in extreme luminosity conditions not adapted to the characteristics of the sensor (e.g., in the night). As such, in specific embodiments of the invention, supervision is provided to assure that the set of reference images obtained during setup are sufficient for generating a strong and robust signature for the zone of interest. The supervision can take the form of feedback to a user regarding the sufficiency of the reference images that have been collected so far, and potential encouragement regarding additional images to be obtained.

In specific embodiments of the invention, the system can calculate a characteristic quantity of a set of reference images and predicate the termination of a setup phase based on the characteristic quantity lying above a sufficiency threshold. The characteristic quantity can be a quantity representing the amount of signal contained in the set of reference images which can be acted upon to generate the signature of the zone of interest. The characteristic quantity can be a quantity representing the signal-to-noise ratio contained in the set of reference images where the signal represents the distinctiveness of the signature of the zone of interest that can be generated from that set of reference images. For example, the characteristic quantity could be a number calculated based on the degree of statistical variation between the images in the set of reference images. Numerous other examples are provided in the detailed description below. Alternatively, or in combination, feedback can be provided to the user during the setup phase to assure that the set of reference images are sufficient. For example, the feedback could provide encouragement regarding additional steps that need to be taken to complete the setup procedure such as taking additional images. In specific embodiments of the invention, the feedback can be generated based on the characteristic quantity. For example, instructions can be provided on a display of the pointing device regarding where a user should move the imager in order to capture an additional image with a higher degree of variation to further improve the characteristic quantity. Numerous other examples of this feedback are provided in the detailed description below.

In a specific embodiment of the invention, a system is provided. The system includes a control device. The control device has a shape which defines a pointing direction of the control device. The system also includes an onboard imager located on the control device. The onboard imager has a field of view which includes the pointing direction. The system also includes one or more computer readable media storing instructions to: receive a reference image; determine a characteristic quantity based on the reference image; generate a feedback message based on the characteristic quantity; and predicate a setup phase termination for the control device on the characteristic quantity.

In a specific embodiment of the invention, a computer-implemented method is provided. The method is conducted with a control device having: (i) a shape which defines a pointing direction of the control device; and (ii) an onboard imager having a field of view which includes the pointing direction. The method includes capturing a reference image, determining a characteristic quantity based on the reference image, generating a feedback message based on the characteristic quantity, and predicating a setup phase termination for the control device on the characteristic quantity.

In a specific embodiment of the invention, a system is provided. The system includes a control device. The control device has a pointing direction. The system also includes an onboard imager located on the control device. The onboard imager has a field of view which includes the pointing direction. The system also includes one or more computer readable media storing instructions to: receive a set of reference images; determining a characteristic quantity based on the set of reference images; and based on the characteristic quantity either: (i) generate a feedback message; or (ii) terminate a setup phase for the control device.

DETAILED DESCRIPTION

Systems and methods that determine a pointing target of a pointing device using an imager located on the pointing device are disclosed. In specific embodiments of the invention, the imager is aligned with a pointing direction of the pointing device. An image from that imager can then be used to recognize a zone of interest towards which the pointing device is currently pointed. The image can be collected during an operational phase of the system and be referred to as a sample image. Subsequently, the system can determine a pointing target within the zone of interest and thereafter create an association with the pointing target in accordance with the approaches described in the summary above. The following disclosure includes specific approaches for a setup phase of the system that allows for recognition of the zone of interests in accordance with the summary above. The recognition of the zone of interest can be facilitated by the collection of a set of reference images during a setup phase of the system. The examples provided in this section are nonlimiting embodiments of the invention and should not be construed to constrict the scope thereof.

Specific embodiments of the invention disclosed herein are provided with reference to a pointing device in the form of a remote control with an integrated touch display, a radio frequency transmitter, and a visible light onboard imager. However, the pointing device could take on various alternative forms. The pointing device could include various components including various user interface elements, additional sensors, and specialized hardware for processing reference images and recognizing zones of interest. As stated in the summary, the pointing device can also be used in combination with a set of supporting devices and remote devices to execute the methods described herein.

In specific embodiments of the invention, the system responsible for conducting the setup phase of operation and determining the pointing target of a pointing device during the operational phase can be the pointing device operating in isolation by itself. However, the system responsible for these actions can also include supporting devices such as a charger for the pointing device and can also include remote devices such as a server or cloud architecture in operative communication with the pointing device. In specific embodiments of the invention, the system responsible for receiving commands from a user, presenting a user interface to a user, and/or providing information to a user from a pointing target can be the pointing device in isolation by itself. However, these tasks can all likewise be conducted by separate supporting and remote devices. For example, the supporting device could receive commands directly from a user (e.g., via a built-in microphone), or relay commands entered via a pointing device to the currently associated controllable object. These separable elements (the pointing device, the supporting devices, and the remote devices) can be referred to as nodes of the system.

The operations of the system can be divided between the nodes in numerous ways depending on the hardware of the pointing device and other design constraints. For example, if the pointing device has limited batteries, memory and logic for conducting resource intensive operations such as storing images or recognizing the signature of a zone of interest can be located on a supporting device such as a charging base for the pointing device. As another example, more resource intensive operations such as initially generating a signature for a zone of interest, calculating a characteristic quantity for a set of reference images used to generate the signature, and generating feedback for a user based on the characteristic quantity can be conducted on a server or cloud architecture as opposed to on the pointing device or any computing device in the same physical environment as the pointing device. In specific embodiments of the invention, the system could be a multi-processor system, with a main host processor that collaborates with an AI accelerator. The main host processor and AI accelerator could both be located on the pointing device. However, the multi-processor system may also be a distributed system, where the host processor collaborates with a remote co-processor (e.g., an AI accelerator). The remote co-processor could be located on a remote server.

In specific embodiments of the invention, one or both of determining the signature and determining if an image is of a zone of interest based on the signature can be conducted at a supporting device. The supporting device could conduct those operations using its internal processor and memory. In specific embodiments of the invention, the supporting device will have a wall socket electrical connection and be less power resource conscious than the pointing device for conducting these heavier load computations. In specific embodiments of the invention, the supporting device will include an AI accelerator in communication with a main host processor either on the supporting device or on the pointing device. Alternatively, the supporting device could receive reference images and store them for later transmission up to a cloud architecture for purposes of analyzing the reference images and/or generating a signature of the zone of interest. The supporting device could also route commands to the appropriate device when the pointing device was setup and deployed.

In specific embodiments of the invention, a cloud architecture communicatively connected to the pointing device can conduct various actions. For example, the cloud architecture could train an initial state for a trainable directed graph that will be deployed with the device. The cloud architecture could provide the initial state to the pointing device, or other supporting device, as a download when the device was first initialized. The cloud architecture could also provide instructions regarding the reference images required to be collected for the setup phase to be accurately conducted. The cloud architecture could also review the images and the progress of determining the characteristic quantity of the reference images and generating feedback to the user if required. The images could be collected by either the imager on the pointing device or an imager on an alternative device.

The pointing device, and any associated supporting devices, can be augmented with specialized hardware associated with recognizing signatures of zones of interest. The specialized hardware can be configured to conduct image processing and recognition algorithms more efficiently that general purpose processors. The specialized hardware could be the AI accelerators mentioned in this disclosure. The specialized hardware can be configured to more efficiently conduct the training and utilization of trainable machine intelligence systems. The trainable machine intelligence systems could be trained using a set of reference images collected during the setup phase of the system. The signatures of specific zones of interest would then be embodied in the weights of the trained system. When deployed, input images from the imager on the pointing device could be fed to the machine intelligence system to determine the zone of interest towards which the pointing device was being pointed.

The specialized hardware can take on numerous forms. For example, the pointing device or an associated supporting device could include a specialized digital signal processor for instantiating, training, or drawing an inference from a trainable image recognition system. For example, the digital signal processor could be embodied by a GPU, an FPGA, chip set, or ASIC specialized for such calculations. The ASIC could be designed to generate an inference as to the signature implicated by a sample image and consume power on the order of microjoules per inference. The GPU or ASIC could be mounted on the pointing device. The digital signal processor could be optimized to accelerate computations such as the linear matrix operations conducted by artificial neural networks (ANNs) conducting image classification inferences. The digital signal processor could be configured to perform multiple compute operations in parallel. As a still further example, the pointing device or a supporting device such as a charger may be augmented with a specialized digital signal processor for purposes of conducting a training or inference operation for the trainable machine intelligence system such that these operations can easily be conducted thereon without excessive battery consumption or processing time.

The pointing device and any associated supporting devices can include one or more interfaces for receiving commands from a user. The pointing device can include a display for presenting information to a user. The pointing device can also receive commands from a user via an interface such as a keypad, touch display, or microphone, or any other known user interface technology. The pointing device could alternatively not have any interface for receiving commands while a supporting device included a touch display, microphone, or gesture recognition interface for receiving commands from the user. For example, a smartphone, tablet, or hub device could be configured to receive commands from the user while the pointing device was used to identify controllable devices. The pointing device could also include a speaker or haptic feedback system for providing information to the user. The display, speaker, or haptic feedback system could provide a cue to the user when the system selected, or locked on to, a pointing target so that the user could be alerted that an association was formed by the system based on that pointing target.

The pointing device could include additional sensors in addition to the imager such as a motion tracker. The motion tracker could be an inertial movement unit (IMU). The pointing device could include an integrated motion tracker (e.g., a magnetometer, accelerometer, a gyroscope, or any 9-axis sensor). The motion tracker could be used to activate the imager. For example, the motion tracker could determine when the pointing device had been moved and then held stationary to indicate that a user was pointing at a pointing target. Upon detecting this movement pattern, the imager could be triggered to collect a reference image or sample image. The additional sensors, such as the motion tracker, could also be used for data fusion applications as described below.

As mentioned previously, reference images of a zone of interest can be obtained in a setup phase to generate a signature for the zone of interest and sample images can be analyzed using this signature at a later time when the device is deployed. In specific embodiments of the invention, both these steps can be conducted by the onboard imager. The reference images can be captured by the same onboard imager used to recognize a zone of interest and determine a pointing direction for the pointing device when the pointing device is deployed. However, the reference images can alternatively be captured by a separate imager while the images that are analyzed when the device is deployed are captured by the onboard imager. The separate imager can be located on a companion device. The companion device can be one of the supporting devices mentioned above. The companion device could be a smartphone or dedicated device for the setup phase. The companion device could include features, not available on the pointing device, that facilitate the execution of the setup phase. For example, the companion device could include a higher resolution display than the pointing device to allow the user to more easily inspect the quality of the reference images or to more readily receive feedback regarding the set of reference images from the system. The companion device could also include means for providing the user with feedback concerning the reference images. The feedback could be provided on a display of the companion device, by a speaker on the companion device, or some other user interface on the companion device. In specific embodiments of the invention, the companion device will be paired with the pointing device over a wireless connection such as a Bluetooth connection and the reference images will be collected by the onboard imager of the pointing device while the reference images are display for inspection, along with any additional feedback for the user such as instructions on additional images to obtain, on a display of the companion device.

The onboard imager, or the imager on the companion device, can take on many forms and can be augmented to capture additional information from a physical environment in which it operates. The imager can obtain images in the form of one, two, or three-dimensional images. The images can be produced using any form of electromagnetic energy such as visible, infrared or ultraviolet light, or electromagnetic energy from any of multiple frequency bands in combination. The imager could be configured to operate with a projector that generated and projected electromagnetic energy visible to the imager for purposes of aiding the imager. The projector could be used to illuminate the environment or to generate a pattern of structured light within the environment to allow the imager to gather additional information from the environment. For example, the imager could include an infrared camera for night vision with an infrared LED or an ultraviolet camera with an ultraviolet structured light projector. In specific embodiments, the infrared LEDs, or other projectors, could be provided by supporting devices positioned around a physical environment so that they did not consume too much energy from the battery of the pointing device. The supporting device could be a charger for the pointing device. The imager could include multiple sub-imagers such as a visible light camera for detecting visible light from the environment and an ultraviolet camera for detecting patterns projected by an ultraviolet light projector.

In specific embodiments of the invention, the imager will have a large capture area in order to maximize the information available to the system for generating a robust signature during the setup phase and for recognizing the signature during the operational phase. For example, the imager could be a wide angle visible light camera that would be able to obtain more information as to the zone of interest via the capture of a larger region with each image. The additional information could include the relative location of proximate corners of a room and/or the distance to the ceiling and floor from the pointing target. The imager could be a fisheye imager. In other embodiments the imager could capture panoramic images such as full spherical panoramic images.

In specific embodiments of the invention, the field of view of the imager will include the pointing direction but will not be centered on the pointing direction. For example, the imager could have a tilt with respect to the pointing direction. The tilt could be selected for specific applications. For example, in the case of a pointing device with a user interface which users are usually reading when operating the device, the imager could have a vertical tilt with respect to the pointing direction to counteract a common bias with respect to that usage pattern. As another example, the imager could have a slight vertical tilt towards the ceiling in order to capture room layout information because the corners of a room as seen from the ceiling-wall interface are generally more visible that those at the ceiling-floor interface due to furniture and other items located on the ground.

The imager could include combinations of sensors such as a visible light camera, and an ultra-violet camera augmented with an ultraviolet LED or laser that projected a pattern in the pointing direction of the device. The combined image could include depth information captured by a depth sensor, such as an ultra-violet or infrared camera detecting projected patterns, in addition to the visible light from the camera. Any form of projected structured light could be projected to capture depth information including visible, ultra-violet, or infrared light. The depth sensor could be any form of depth sensor including a LIDAR, stereo-imaging rig, or any other form of sensor that captures depth information or information from which depth information can be derived. In these embodiments, the image could be an RGB-D matrix or depth cloud. In other approaches, the imager and image could be based solely on depth information and ignore texture data entirely. For example, the image could be the capture of the positions in a two-dimensional image of infrared points that are illuminated by a projection of structured light. The specific sensors utilized for obtaining images may change based on the conditions of the environment in which the imager is operating. For example, the pointing device, or supporting devices such as the charging station, could include an ambient light sensor (ALS) and could turn off the visible light sensor if it is determined that there is not enough ambient light in the environment for the visible light sensor to provide actionable information.

Figure 2:
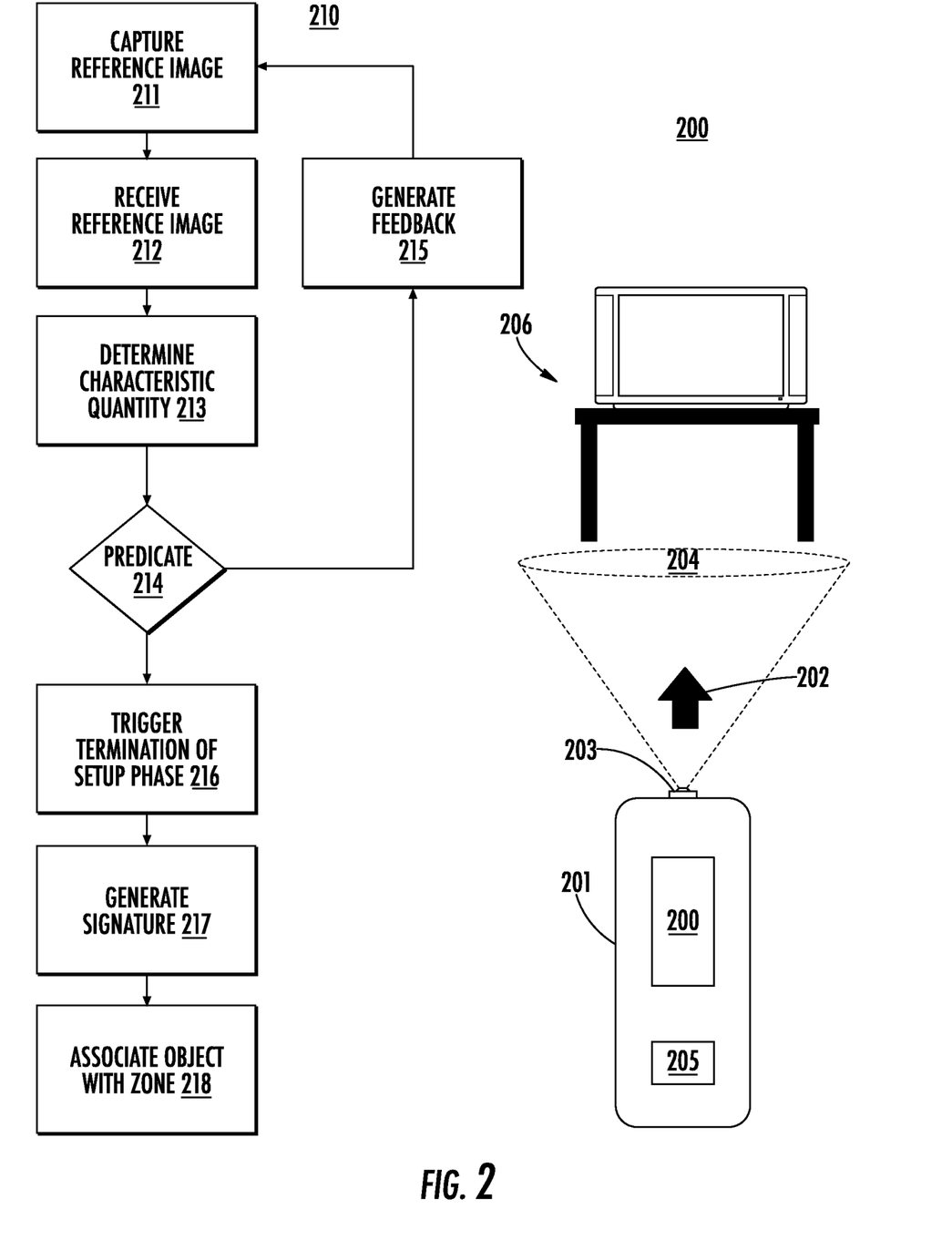
FIG. 2 illustrates a block diagram of a system and an accompanying flow chart of a computer-implemented method for conducting a setup phase for that system in accordance with specific embodiments of the invention disclosed herein

FIG. 2 illustrates a block diagram 200 of a system and an accompanying flow chart 210 of a computer-implemented method which can be executed using that system in accordance with specific embodiments of the invention disclosed herein. Block diagram 200 includes a control device 201. The control device 201 has a shape which defines a pointing direction 202 of the control device. Block diagram 200 also includes an onboard imager 203 located on the control device 201. As illustrated, the onboard imager 203 has a field of view 204 which includes the pointing direction 202. Block diagram 200 also includes computer readable media 205 which stores instructions to execute each of the steps of flow chart 210. As described in the summary, computer readable media 205 can be entirely located within control device 201 such as in a memory internal to control device 201, or it can be distributed across a system including control device 201.

Flow chart 210 begins with a step 211 of capturing a reference image. The reference image can be captured by the onboard imager 203 or by an imager on a companion device. Flow chart 210 continues with a step 212 of receiving the reference image. This step can refer to receiving the image for storage in a memory on the pointing device from the onboard imager of the processing device, or the receiving of the image on one node of the system from an alternative node on the system on which the image was captured (e.g., the image is captured on a companion device in the form of a smartphone and is then transferred to a pointing device charger or remote server where it is received).

Flow chart 210 continues with a step 213 of determining a characteristic quantity based on the reference image. If additional reference images have previously been captured by the system at this point, step 213 can also be conducted based on the set of reference images. The characteristic quantity can be a value calculated with respect to the most recent reference image or to an entire set of reference images that have been collected. The characteristic quantity can be a quality metric for the image quality of the most recent reference image, a number of reference images in the set of reference images, or a more complex value reflecting the set of reference images calculated with graphic and geometric analysis assessing the variation of those images in terms of the viewpoints occurring in the images, the luminosity occurring in those images, etc. The characteristic quantity can be a completion metric of a three-dimensional reconstruction of at least a portion of the zone of interest or pointing target from the reference images (e.g., the surface already discovered as compared to the total surface to discover). The characteristic could be a diversity metric computed from the spectral contents of the different reference images. The characteristic quantity could be a diversity metric of the estimated point of views of the reference images.

Flow chart 210 continues with a step 214 of predicating a setup phase termination for the pointing device on the characteristic quantity. In this step, the characteristic quantity generated in step 213 can be evaluated and used to determine if the setup phase is complete. In this way, the termination of the setup phase is predicated on the characteristic quantity. The evaluation of the characteristic quantity can involve comparing the quantity to a threshold (e.g., the quantity exceeds, is equal to, or is below a given threshold). The comparison will depend on the type of characteristic quantity being calculated in step 214. In a specific embodiment, the characteristic quantity will be a number of reference images in the set of reference images. The threshold would then simply be a predetermined required number of reference images the user would need to capture. In another specific embodiment, the characteristic quantity will be a measure of the variance or cross-correlation between different images in the reference image set. The variance or cross-correlation can be measured with respect to the overall texture map, imager pose, luminosity, or other aspect of the images. However, regardless of which specific quantity is calculated, step 214 is predicated on the characteristic quantity indicating that the reference image, or set of reference images, evaluated in step 213, contain sufficient information to generate a robust and distinct signature for the zone of interested in the reference image. For example, the characteristic quantity could be a level of cross correlation between the reference images in the set of reference images. In this case, the evaluation would require the characteristic quantity to be below a threshold and thereby indicate that the images were sufficiently distinct. As another example, the characteristic quantity could be a level of variance between the reference images in the set of reference images. In this case, the evaluation would require the characteristic quantity to be above a threshold and thereby indicate that the images were sufficiently distinct.

Flow chart 210 can continue with a step 215 of generating a feedback message based on the characteristic quantity. In this branch of the flow chart, the setup phase was not terminated as the set of reference images were found to be either incomplete or otherwise insufficient in step 214. The feedback message can provide guidance or encouragement for a user to continue with the setup phase to improve the set of reference images. The feedback message can be textual or symbolic. For example, the feedback message could be a textual instruction provided on a display of the pointing device to capture additional images (e.g., move left, move right, move back, move closer, take the image again while holding the imager steady, turn on more lights, turn off lights). The textual message can also be provided via an auditory signal using a speaker. As another example, the feedback message could be a fraction, progress bar, or other symbolic representation representing the number of reference images taken as compared to the number of reference images required. The feedback message can be provided visibly on a display or audibly via a speaker. The feedback message can be generated based on the characteristic quantity or based on the reference image directly. The feedback message could include the reference image itself so that a user could inspect the reference image and diagnose why the system is finding the reference image, or set of reference images, insufficient. Various combinations of the types feedback messages disclosed herein could also be provided to a user. For example, the feedback could include a reference image provided with a request for a user to confirm the quality of the reference image, and the feedback message could also include a progress indicator showing how many reference images had been accepted by the user as compared to a target threshold number.

In specific embodiments of the invention, the feedback message will be displayed on a companion device such as a smartphone. If the companion device included a superior display than the pointing device, these embodiments would provide certain benefits where visual inspection of the feedback message was important such as where the feedback message included the reference image itself. In these embodiments, the pointing device could capture the image and send it to the companion device for display wirelessly. Alternatively, the companion device could be used to both capture and display the reference images.

In specific embodiments of the invention, the feedback message could include instructions on how to capture the at least one additional reference image. The instructions could be provided to assure that the next reference image acquired was maximally valuable to the system in terms of its effect on the characteristic quantity. The instructions could specify at least one position for the pointing device or the companion device (whichever device was gathering the reference images) to be in when capturing the at least one additional reference image. For example, the user could be presented with an arrow on a display indicating a direction that they should move in order to capture the next reference image. As another example, the user could be provided with textual instructions via either a visible display or auditory instructions to "take an additional reference image for this zone from the left of where you just obtained an image." The feedback could be provided in real time to guide the user towards the correct imager pose. For example, the feedback could be an AR signal. For example, the feedback could be highlighting which portion of the zone had not yet been captured sufficiently (e.g., visible highlighting overlain on an image of the zone in real time). As another example, the feedback could show an arrow which was continuously updated regarding exactly how the device should be moved until it is located at the optimal position for creating maximal value for the reference set.

In specific embodiments of the invention, the feedback message could be specific to the most recently captured reference image (e.g., the determining of the characteristic quantity could include determining that the most recently acquired reference image is of insufficient quality due to poor lighting, blurring, insufficient variation from prior reference images, etc.). The feedback message could them simply comprise instructions to recapture the same reference image, or instructions on modifications to make prior to capturing a reference image from the same vantage point (e.g., "hold the imager steady" or "turn on more lights").

In specific embodiments of the invention, the feedback message could regard improvements that can be made to the set of reference images as a whole (e.g., the determining of the characteristic quantity could determine that the set of references images was lacking in some form of variance). The feedback message can regard at least one additional reference image to be captured to improve the characteristic quantity of the set of reference images. For example, the evaluation of the characteristic quantity could indicate that a user needed to capture additional images from a different angle, with different luminosity, with objects removed or taken from the zone of interest, etc. The feedback message could then provide this information to the user (i.e., instructions to move to a specific angle that would complete the set of required distinctive viewpoints or instructions to turn on additional lights).

In specific embodiments, step 211 is conducted while varying the environment to increase the diversity of the reference images. The variance in the environment can be conducted according to a set routine or a routine that varies during the collection of the set of reference images based upon the characteristic quantity. The variances in the environment can be created by an environmental variance system. As the pointing device can be a control device intended to serve as a controller for a large number of devices, and the environmental variance system may be a component of the overall system which includes the pointing device, the environmental variance system may have access to a large number of devices that can be used to vary the environment. Indeed, in specific embodiments, the pointing device can be part of the environmental variance system and serve as the originator of the commands used to vary the environment.

Various environmental variations can be introduced via various methods based on the devices that are under the control of the environmental variance system. For example, the luminosity of the room could be changed by turning lights on or off, changing the color of any color changing lights, opening or closing window shades, or turning a television or other device with a display on or off. As another example, the visual appearance of a room could be altered by displaying different color patterns or images on a television or other device with a display. These environmental variations can be created as part of the routine described above and based on the characteristic quantity. In embodiments in which the characteristic quantity is a measure of the variance or cross-correlation between the luminosity or overall texture map of the different images, the feedback message can be generated with computer readable instructions regarding a desired variance for the next reference image, and the environmental variance system can create the required variance to set the environment in the condition required in response to the feedback message. For example, the characteristic quantity could indicate that the reference images lacked sufficient variance in luminosity, the feedback message could be an instruction to increase luminosity, and the environmental variance system could select a potential method for increasing luminosity in response. If the environmental variance system only had access to a single light, it could decrease the luminosity of the light in response to the feedback message. If the environmental variance system had access to a light and a window covering, the environmental variance system could be designed to select different methods and explore their impact on the diversity of the reference images (e.g., first try the window covering, and if the next feedback message still indicates that more luminosity variance is required, then dim the light).

As illustrated, if the setup phase is not terminated, the flow chart will loop back through steps 212 and 213 in which an additional reference image is captured, received, and added to the set of reference images; and the characteristic quantity was redetermined using the additional image. This process could involve receiving at least one additional reference image, and redetermining the characteristic quantity based on the reference image captured in the first iteration and the at least one additional reference image. The flow chart will then return to a point where the system could trigger, after the characteristic quantity has been redetermined, an end to the setup phase for the system based on the characteristic quantity. This step could involve a further iteration of step 214 which instead of leading to another iteration through the loop, led to the triggering of the end of the setup phase. The steps in flow chart 200 that have been described to this point can be conducted by a companion device such as a smartphone instead of with control device 201. However, the control device, and specifically the imager on the control device, can in some specific embodiments be used to capture the reference image and additional reference images in step 211, while the feedback from step 215 is provided on a display of a companion device such as a smartphone.

As illustrated, flow chart 210 can continue on from step 214 with a step 216 of triggering the termination of a setup phase for the pointing device. Step 216 can be conducted at any time during the setup phase when the set of reference images are determined by the system to be sufficient. As illustrated, the triggering of the termination of the setup phase is conducted in response to the act of predicating the termination of the setup phase on the characteristic quantity. The setup phase illustrated in FIG. 2 is illustrated with reference to a single zone of interest 206. However, the setup phase can include collecting reference images for multiple zones of interest at a time. As such, the steps of flow chart 200 discussed so far can be repeated multiple times (including multiple sets of iterative cycles through step 215) in order to collect reference images for those additional zones of interest. The setup phase can also be revisited whenever a user wanted to add an additional zone of interest to an existing system. Re-entry into the setup phase could be triggered by a command from the user to add an additional zone.

The termination of the setup phase can trigger additional steps required to place the system in condition for the operational phase. These steps can include generating a signature for the zone of interest and associating a pointing target or object with the zone of interest. Flow chart 210 includes a step 217 of generating a signature for the zone of interest using the reference image captured in step 212. The signature can be generated using a set of reference images captured via multiple iterations of step 212. Flow chart 210 also includes a step 218 of associating an object with the zone of interest. The object can be a communication object or a control object. The association between the object and the zone of interest can be used during the operational phase to create the appropriate association for routing communications or commands through the system when the pointing device is pointed at a zone of interest and the zone of interest is recognized using the generated signature.

The signature generated in step 217 can be a representation of the zone of interest which can be derived from two- or three-dimensional data regarding the zone of interest. The signature can be embodied in the weights of a trained ANN used to process images to determine if they are images of that zone of interest. The signature could also be a trained directed graph, a series of points/coordinates, or some other form of compressed information regarding the zone that can be used for recognition purposes. The signature can be a feature vector designed to match the output of a classification system which is fed input images of the zone of interest. In specific embodiments of the invention, there may be a plurality of signatures for the zone (e.g., multiple two-dimensional images or two-dimensional features taken from different viewpoints) or a single generic signature (e.g. a three-dimensional model of the zone create by reconstruction based on multiple two-dimensional reference images or features from those reference images). The signature may be a combination of day and night signatures developed as the lighting conditions impact the reference images. In specific embodiments of the invention, a different library of signatures will be accessed based on the characteristics of a sample image obtained when the pointing device is in an operational phase. For example, the system could keep a library of low-light signatures of a set of zones of interest as well as a library of bright-light signatures of that set of zones of interest. Using an ALS on the pointing device, determining the zone of interest during the operational phase can include accessing only the low-light signatures if the ALS detects a low lighting condition and vice versa for a bright lighting condition.

In specific embodiments of the invention the characteristic quantity is a diversity metric of the estimated point of views of the reference images (e.g., estimates of the perspective of each reference image would be measured or calculated and then analyzed to determine if there was enough variation between the perspectives). The system could determine and analyze the different in points of view between the reference images. This step could be conducted by computing interest points in two reference images (e.g., ORB descriptors), associating those points across the images, computing the essential matrix from this association, and then deriving the change in orientation and the direction of the change in position between the viewpoints. In these embodiments, a threshold used to evaluate the characteristic quantity for predicating termination of the setup phase could be an absolute angular distance between two view orientations to decide if they are different enough. The number of sufficiently different orientations using this metric could also be counted across the reference images and displayed to the user as a feedback message. The threshold used to predicate termination of the setup phase could also be a number of reference images with sufficiently different orientations as measured using the aforementioned metric.

In specific embodiments of the invention the characteristic quantity could be a completion metric for a three-dimensional reconstruction of at least a portion of the zone of interest or pointing target. The reference image can be used to reconstruct a three-dimensional representation of the zone of interest, terminating (or suggesting the user to terminate) the setup phase if the three-dimensional reconstruction is complete enough (meaning, if there is no dead zone in the reconstruction). This three-dimensional reconstruction may result from a procedure similar to the one considered in the prior paragraph, where the depth of the interest points is retrieved given the two images from which they appear and the relative orientation and direction of translation derived from the essential matrix is computed for the two images.

In specific embodiments of the invention, the process of obtaining images from the user during the setup phase will be conducted using a live stream of images captured by the onboard imager or imager of the companion device. The pointing device could also conduct analysis on the reference images captured in this live stream such that the characteristic quantity of the set of reference images was being continuously updated as the imagers were captured. Likewise, the feedback could be calculated in real time and provided to the user. The feedback in these embodiments could be the AR signals described above. For example, an arrow placed on a display of the live stream images indicating which direction the imager should be moved or highlighting on different surfaces of the live stream images indicating which surfaces had been sufficiently captured and added to a three-dimensional reconstruction of the physical space.

In specific embodiments of the invention data fusion is used to improve the setup phase and/or operational phase. Data fusion can be used to provide more accurate feedback or a better estimate of characteristic quantities. Data fusion could involve adding additional data such as motion tracking and/or positional data to the imager data. For example, adding a pose estimate for the imager to the image taken from that pose. In specific embodiments of the invention, the system will comprise a motion tracker on the control device and computer readable media storing instructions to determine the characteristic quantity based on the reference image and data from the motion tracker, generate the feedback message based on the characteristic quantity and data from the motion tracker, or recognize the signature of a zone of interest using the data from the motion tracker during an operational phase.

Using a visible light camera as the only sensing element can leave the system vulnerable to obscurity, visual occlusion, and visual ambiguity between multiple places (e.g., two blank walls). To counter these problems, one possibility is to complement a visible light imager with another information source such as an IMU, giving a sense of the imager's pose (i.e., of its joint position and orientation). The pose estimate can then serve as a fallback when the sensor of the imager is obstructed or when the ambient luminosity is too low for the sensor to work properly. The pose estimate can then serve as an additional information to discriminate between two zones having the same visual aspects in the operational phase Furthermore, the pose information can be used to assist in calculating the characteristic quantity of a set of reference image, particularly those which are based on a required degree of variance between the viewpoint used to capture each reference image.

In specific embodiments of the invention, pose estimates for the imager can be assisted through ex ante knowledge of the position of each zone of interest. This can be done: (1) by capturing the pointing device's pose each time a reference image is taken; and (2) triangulating the position of the reference zone from at least two pose estimates captured in (1). Similar approaches can be used to correct for drift in sensors used to determine the pointing device's position. Pose estimates from IMUs are subject to drift, meaning the estimate slowly diverge from the true pose. To counter this, the imager's output can be used to correct for the drift each time a known zone of interest is recognized.

Figure 3:
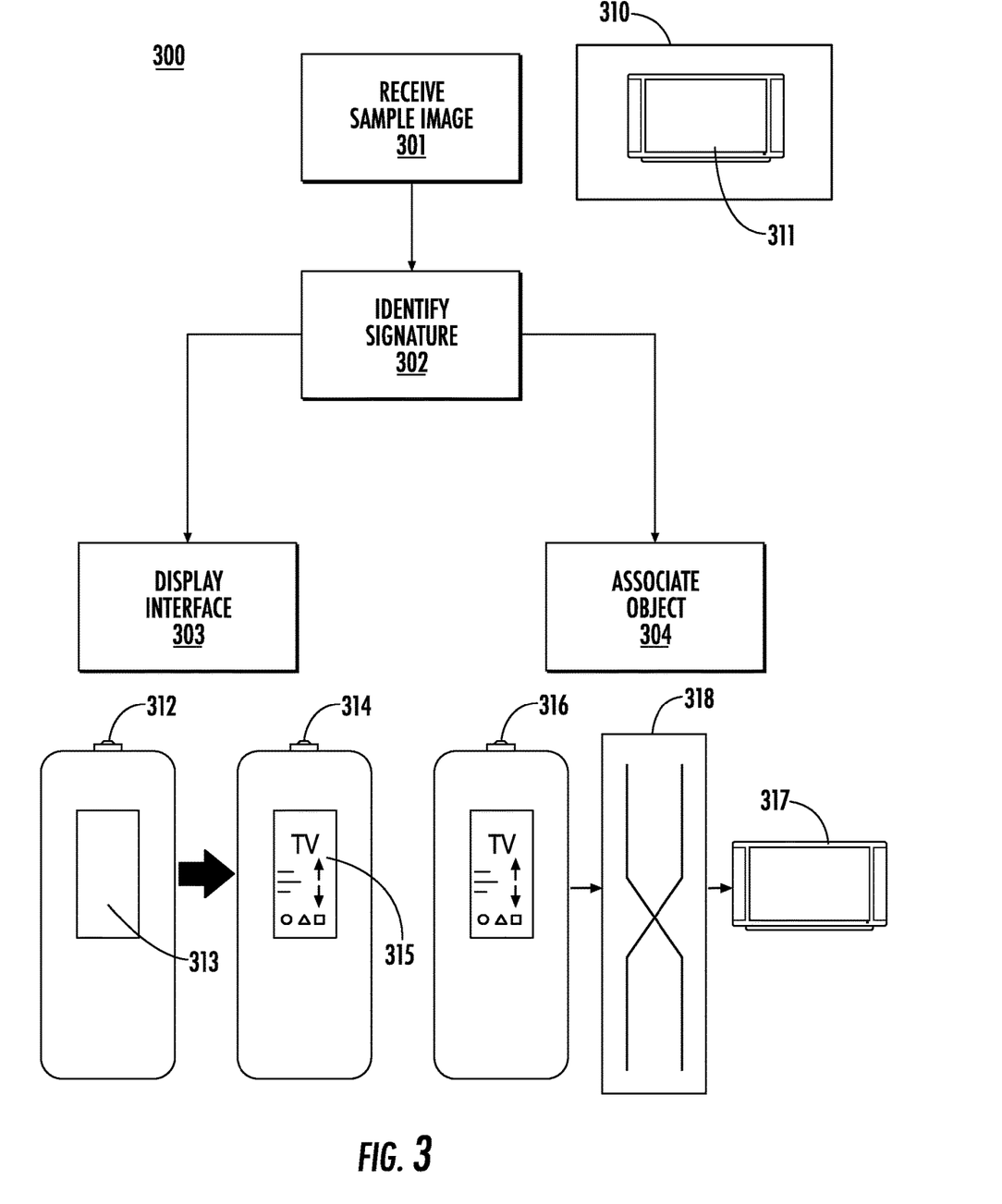
FIG. 3 illustrates a method for conducting an operational phase of a system setup using the process described with reference to FIG. 2 in accordance with specific embodiments of the invention disclosed herein.

FIG. 3 illustrates a flow chart for an operational phase of a system in accordance with specific embodiments of the invention. Flow chart 300 begins with a step 301 of receiving a sample image. The sample image can be a pointing target image from an onboard imager on the pointing device. As illustrated, sample image 310 includes a visible light encoding or a television 311. The television represents the zone of interest. Flow chart 300 continues with a step 302 of identifying a signature using the sample image. The signature will be a signature of the zone of interest represented in image 310. The step can involve providing the information from image 310 to a classifier, trained machine learning system, trained support vector machine, or any other system capable of discerning the signature of a zone of interest from an image.

In specific embodiments of the invention, once a signature has been recognized, the system can form an association with a controllable device or other pointing target the system has been designed to communicate with. Flow chart 300 accordingly includes a step 304 of associating an object by the system. In specific embodiments of the invention, the system can also provide a user interface to the user upon recognizing the signature. As illustrated, flow chart 300 continues with a step 303 of displaying a controllable object interface on a display in response to identifying the signature. FIG. 3 shows a remote in a first state 312 with display 313. The execution of step 303 is accordingly illustrated in the transition of the same remote to state 314 in which the controllable object interface 315 of television 311 is provided on display 313. This transition can be conducted in response to detecting the signature of the zone of interest if the zone of interest had previously been associated with the controllable object, such as in accordance with the setup phase procedures described herein.

Once the pointing target of the pointing device is selected, the information can be used in various ways. The selection of the pointing target can persist until cleared by a user, or it can change in lock step with the instantaneous pointing direction of the pointing device. While a specific pointing target persists as the selected target, the pointing device itself, or a system to which the pointing device belongs, may be configured to interact with a specific device or system associated with that specific pointing target. In specific embodiments of the invention, the pointing device can be a remote control, and the pointing target can be selected in order to identify which controllable device the remote should interact with at any given time. In specific embodiments of the invention, the pointing device can have a display, and the pointing target can be selected in order to identify which control interface should be presented on the display at any given time. The display could be a touch display, or other combination of display and input interface used to present information to the user and receive control inputs from the user. As an example that combines the two aforementioned sets of embodiments, when a user points the pointing device at a television, a channel selector and volume selector could be presented on the display along with the word "Television" identifying the currently selected device. Subsequently, when the user points the pointing device at a lightbulb, the display could present an on-off switch, a dimmer, or a color selector based on the features associated with the lightbulb.

The relationship between the pointing target and the association made by the system while that specific pointing target is selected can take on various forms. For example, the pointing target may itself be a controllable object that should be the subject of an association by the control system. However, the pointing target may be a physical zone defined by certain features that are detectible by the imager but with no physical association with a controllable object. Instead, the system may have previously associated the pointing target with a specific controllable object. As such, the controllable objects can be real or virtual objects. For example, the controllable objects can be physical automated building components or smart home devices that receive commands or provide information such as lighting devices, televisions, electronic window shades, thermostats, actuators for commercial HVAC equipment, smoke alarms, chemical sensors, security devices, and the like. However, the controllable objects can also be virtual objects that receive commands or provide information such as web accessible APIs or other virtual objects. Additionally, the flexible association between pointing targets and controllable objects assures that there is no requirement that a user be in position to physically see a controllable object in order to select the object.

The chain of operations from obtaining an image, selecting a pointing target, associating the pointing target or controllable object, and utilizing that association in accordance with the examples provided above can be implemented in various ways. In particular, the routing of commands or information in accordance with the currently selected pointing target can be conducted by various nodes in the system. For example, a command could be received via an interface on the pointing device itself, such as a touch display or microphone, or it could be received via an entirely separate system such as a microphone located in the same room as the pointing device. Furthermore, the pointing device could merely pass images from the imager to a separate node in the system, or it can conduct all the steps necessary to generate a command which is specifically addressed for routing to a given controllable device. The pointing device itself can capture images collected thereon and either store and process them in place or transmit them to an alternative device for storage and processing. For example, the pointing device could send images to a charger which would then determine what object should be the subject of an association by the control system, and route commands to that object. In the same way, the pointing device can independently associate a controlled device with a command, or it can just associate a pointing target with a command while a supporting system takes the next step of associating the command with the controlled device via a stored association between pointing targets and controlled devices stored and maintained by that supporting system.

In specific embodiments of the invention, the manner in which commands are actually routed through the system can vary according to the specific implementation. FIG. 3 provides the example of a pointing device in the form of remote 316, which has been associated with a control device in the form of a television 317, such that a routing system 318 routes commands from the remote 316 to the television 317. Routing system 318 could be fully incorporated into remote 316 and involve an IR transmitter that could be tuned to transmit signals to various devices, including the IR receiver of television 317. However, routing system 318 can also involve additional devices such as a charging station for remote 316. Routing system 318 could also include any number of local or wide area networks, the Internet, and remote devices such as servers and an accompanying cloud architecture. The charging station could include an IR transmitter for communicating with television 317 and a different wireless communication system for communicating with remote 316. Furthermore, as described elsewhere herein, the remote or other pointing device could be used simply to form association 302 while the commands routed by routing system 318 originated with a separate device. For example, the commands could be received by a microphone on a charger for remote 316 or any microphone with a communicative interface to routing system 318.

Figure 4:
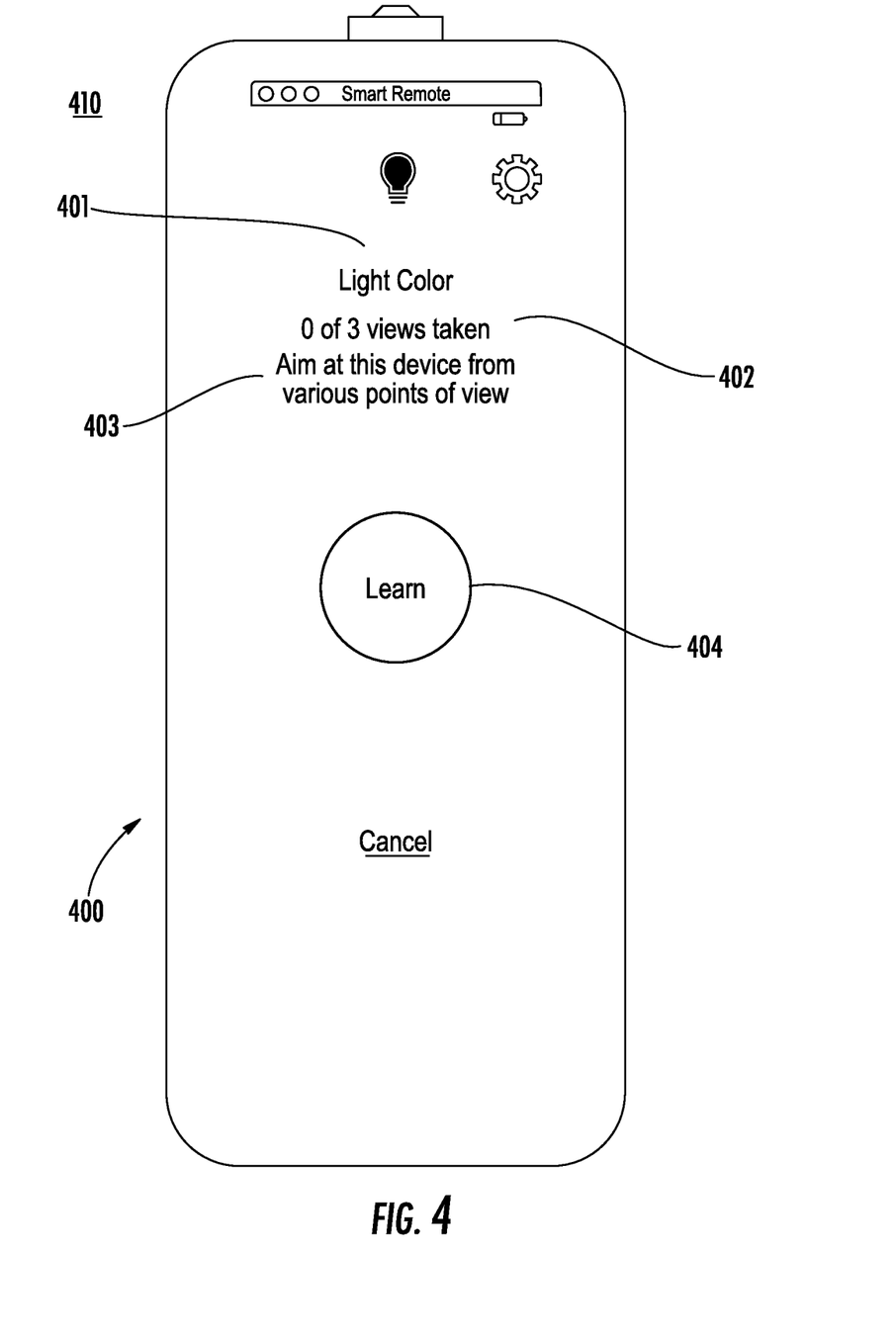
FIG. 4 illustrates a user interface presented on a pointing device in accordance with specific embodiments of the invention disclosed herein.

FIG. 4 provides a potential user interface 400 provided on a display of a remote control 410 to guide a user in obtaining a set of reference images in accordance with specific embodiments of the invention. The user interface is presented on a touch display of remote control 410. At this point in the setup process, the system has already identified a multicolored light at a potential pointing target. The pointing target is here referred to as a potential pointing target because it has not yet been added to the set of pointing targets known to the system. The pointing target that is the subject of the current portion of the setup process is identified in region 401 on the display. The user interface 400 additionally shows a counter 402 of a number of views of the pointing target that the user is being instructed to collect. Additional instructions can be provided to help guide the user in obtaining appropriate images. The user is also presented with a control 404 for instructing the imager to obtain an image. The counter and region for additional instructions can be used to provide the user with other types of information regarding perspective changes, lighting changes, and other feedback from the system to guide them through a successful execution of the process of obtaining images. The user interface of FIG. 4 could provide a similar user experience flow for obtaining images of a zone of interest. Indeed, in specific embodiments, the user might not know that the system is capturing information regarding a zone of interest and could instead be provided instructions regarding reference images with respect to a pointing target located within that zone.

The images received in step 212 could undergo various forms of preprocessing before they were applied to determine a characteristic quantity or identify a signature. For example, if the images were visible light images, the image could undergo auto white balance, auto focus, and image stabilization, and any other image standardization procedure in order to prepare the image to be used as a reference for how the pointing target will appear later. The images could be rectified using a rolling shutter camera model. In a related approach, the images could be obtained using a use a global shutter camera to assist in normalizing the images as they are obtained. The preprocessing could further include image processing to compensate for changes in luminosity during the setup phase. This type of processing could also be applied to images collected when the pointing device is operating in the deployed state. In embodiments in which the pointing device obtains various kinds of data, the preprocessing could also include fusing the data from the various sensors together such as in the case of forming an RGB-D point cloud by merging visible light and depth data.

These same types of preprocessing mentioned above could be applied to images collected when the pointing device is operating in the deployed state such as the images received in step 301. Indeed, various methods of preprocessing to normalize the images would aid the system in matching images taken of the same pointing type because spurious differences would be eliminated.

In specific embodiments of the invention, methods, such as methods exemplified by flow chart 300, can adapt to fault conditions detected by the system or to major changes in the availability of data. For example, the pointing device could default, upon a fault condition or lack of data, to a manual mode in which the device to be controlled is identified by the user through some other means such as a voice command or selecting the device in a presented menu on a touch display of the pointing device. The lack of data or fault condition can be detected in numerous ways. For example, an ambient light sensor, or a control system cognizant of things like the status of lights in the room and time of day, could control which types of imagers could be used to collect images, and what modifications might need to be conducted to the procedure of generating an inference therefrom. In accordance with this example, a pointing device with both a visible light sensor and an IR sensor could deactivate the visible light sensor if the device was being operated on in the dark. As another example, the system could determine if a major modification was made to the physical location or any given zone such that the system could no longer reliably identify a zone. More specifically, the system could determine if a user had rearranged the physical space from when the setup procedure was conducted such that the processes returned to the setup phased for recalibration and refinement of the signature associated with the zone.

In any of the preceding examples, the option to switch to a default mode could be presented to the user instead of automatically exiting the imager-based mode or automatically altering the performance of the imager-based mode. The option to switch to a default mode could also be continuously presented to the user via a configurable setting regardless of the presence of a fault condition of lack of data condition.

In specific embodiments of the invention, the components of the system could be attached to a mobile robot to automatically adjust the physical position of the component throughout the setup or operational phases of use. For example, the pointing device, the supporting device, control device, and companion device mentioned above could all or individually be placed on a mobile robot. The mobile robot could be a treaded, wheeled, or legged robot. The mobile robot could be an aerial robot such as a miniature quadcopter. The mobile robot could be a fixed tripod or other support attached to a pivoting imager mount where the robot could vary and set the pose of an attached imager. Any of the mobile robots mentioned previously could also be augmented with such a pivoting imager mount. The mobile robot could provide the device with 6-degree-of-freedom (DOF) mobility to allow the device to have variant x- y- and z-positions within the environment as well as variant pitch, yaw, and roll imager poses. The robot could likewise change the zoon of the imager automatically.

In specific embodiments of the invention, the position of the device could be varied by the mobile robots mentioned above during the setup phase to increase the diversity of the reference images. The position could be varied according to a set routine or a routine that varies during the collection of the set of reference images based upon the characteristic quantity. The position variations can be created as part of the routine described above and based on the characteristic quantity. In embodiments in which the characteristic quantity is a measure of the variance or cross-correlation between the camera pose or physical appearance of the environment of the different images, the feedback message can be generated with computer readable instructions regarding a desired variance for the next reference image, and the mobile robot can create the required variance to set the environment in the condition required in response to the feedback message. For example, the characteristic quantity could indicate that the reference images lacked sufficient variance in camera pose, and the mobile robot could move an imager to a different location to obtain another reference image. As another example, the characteristic quantity could indicate that the zone lacked sufficient physical variance, and the mobile robot could move itself or other items within the zone to increase that diversity.

While the specification has been described in detail with respect to specific embodiments of the invention, it will be appreciated that those skilled in the art, upon attaining an understanding of the foregoing, may readily conceive of alterations to, variations of, and equivalents to these embodiments. For example, the disclosure used the example of a remote control as a pointing device and determining pointing direction was used to route commands to a controllable device. However, the approach can more broadly apply to any pointing device such as a, presentation pointer, inventory management device, or a toy used for wireless tag. Furthermore, the same approach can be applied for determining the heading of any device in a specific physical environment such as for a robot or drone designed to self-navigate through a given space. Furthermore, many of the approaches disclosed herein can apply to a device with a built-in imager even if they were not initially intended to be used as pointing devices. For example, the camera located on the back of a smartphone camera could be used as the imager aligned with the pointing direction of the smartphone while the display was used as the control interface. These and other modifications and variations to the present invention may be practiced by those skilled in the art, without departing from the scope of the present invention, which is more particularly set forth in the appended claims.

What is claimed is:

1. A system comprising:
a control device, wherein the control device has a shape which defines a pointing direction of the control device;
an onboard imager located on the control device, wherein the onboard imager has a field of view which includes the pointing direction; and
one or more computer readable media storing instructions to:
receive a reference image indicative of a zone of interest in a physical location;
determine a characteristic quantity based on the reference image, the characteristic quantity being representative of distinctiveness of a signature of the zone of interest;
generate a feedback message based on the characteristic quantity; and
predicate a setup phase termination for the control device on the characteristic quantity;

wherein the system further comprises one of the following features (i) to (iii):
(i) the feedback message regards at least one additional reference image to be captured to improve the characteristic quantity, and the feedback message includes instructions on how to capture the at least one additional reference image;
(ii) the determining of the characteristic quantity includes determining that the reference image is of insufficient quality, and the feedback message includes instructions to recapture the reference image; or
(iii) the one or more computer readable media further storing instructions to disable a capture interface on the control device based on the characteristic quantity, wherein the determining of the characteristic quantity based on the reference image is conducted in real time.

2. The system of claim 1, wherein the one or more computer readable media further store instructions to:
receive at least one additional reference image;
redetermine the characteristic quantity based on the reference image and the at least one additional reference image; and
triggering, after the characteristic quantity has been redetermined, an end to the setup phase for the system based on the characteristic quantity.

3. The system of claim 1, wherein the one or more computer readable media further store instructions to:
alter an environment in which the control device is located based on the feedback message;
wherein altering the environment comprises changing one of: a luminosity of the environment, a position of a mobile robot in the environment; and an image displayed on a screen in the environment.

4. The system of claim 1, wherein:
the feedback message regards at least one additional reference image to be captured to improve the characteristic quantity, and the feedback message includes instructions on how to capture the at least one additional reference image.

5. A system comprising:
a control device, wherein the control device has a shape which defines a pointing direction of the control device;
an onboard imager located on the control device, wherein the onboard imager has a field of view which includes the pointing direction;
a companion device having a companion device imager and a display; and
one or more computer readable media storing instructions to:
receive a reference image captured by the companion device imager;
determine a characteristic quantity based on the reference image;
generate a feedback message based on the characteristic quantity;
predicate a setup phase termination for the control device on the characteristic quantity; and
display the reference image on the display.

6. The system of claim 5, wherein:
at least one additional reference image is captured by the companion device imager; and
the instructions specify at least one position for the companion device to be in when capturing the at least one additional reference image.

7. The system of claim 1, wherein:
the determining of the characteristic quantity includes determining that the reference image is of insufficient quality, and the feedback message includes instructions to recapture the reference image.

8. The system of claim 1, the one or more computer readable media further storing instructions to:
disable a capture interface on the control device based on the characteristic quantity, wherein the determining of the characteristic quantity based on the reference image is conducted in real time.

9. The system of claim 1, the one or more computer readable media further storing instructions to:
generate a signature for a zone of interest using the reference image;
associate a communication object with the zone of interest;
receive a pointing target image from the on board imager;
identify the signature using the pointing target image; and
activate a communication interface for the communication object in response to identifying the signature.

10. The system of claim 1, the system further comprising:
a display on the control device; and
wherein the one or more computer readable media further stores instructions to:
generate a signature for a zone of interest using the reference image;
associate a controllable object with the zone of interest;
receive a pointing target image from the on board imager;
identify the signature using the pointing target image; and
display a controllable object user interface on the display in response to identifying the signature.

11. The system of claim 1, the system further comprising:
a motion tracker on the control device; and
wherein the one or more computer readable media further stores instructions to either:
determine the characteristic quantity based on the reference image and data from the motion tracker; or
generate the feedback message based on the characteristic quantity and data from the motion tracker.

12. A computer-implemented method, conducted with a control device having: (i) a shape which defines a pointing direction of the control device; and (ii) an on board imager having a field of view which includes the pointing direction, comprising:
capturing a reference image indicative of a zone of interest in a physical location;
determining a characteristic quantity based on the reference image, the characteristic quantity being representative of distinctiveness of a signature of the zone of interest;
generating a feedback message based on the characteristic quantity; and
predicating a setup phase termination for the control device on the characteristic quantity;
wherein the method further comprises one of the following features (i) or (ii):
(i) the step of determining the characteristic quantity includes determining that the reference image is of insufficient quality, and the feedback message includes instructions to recapture the reference image; or
(ii) the method further comprises disabling a capture interface on the control device based on the characteristic quantity, wherein the step of determining the characteristic quantity based on the reference image is conducted in real time.

13. The computer-implemented method of claim 12, further comprising:
receiving at least one additional reference image;
redetermining the characteristic quantity based on the reference image and the at least one additional reference image; and
triggering, after the characteristic quantity has been redetermined, an end to the setup phase based on the characteristic quantity.

14. A computer-implemented method, conducted with a control device having: (i) a shape which defines a pointing direction of the control device; and (ii) an on board imager having a field of view which includes the pointing direction, comprising:
capturing a reference image using a companion device, wherein the companion device has a companion device imager and a display;
determining a characteristic quantity based on the reference image;
generating a feedback message based on the characteristic quantity;
predicating a setup phase termination for the control device on the characteristic quantity; and
displaying the reference image on the display.

15. The computer-implemented method of claim 14, wherein:
the feedback message regards at least one additional reference image to be captured to improve the characteristic quantity.

16. The computer-implemented method of claim 15, wherein:
the feedback message includes instructions on how to capture the at least one additional reference image.

17. The computer-implemented method of claim 16, further comprising:
capturing the at least one additional reference image using the companion device imager; and
wherein the instructions specify at least one position for the companion device to be in when capturing the at least one additional reference image.

18. The computer-implemented method of claim 14, further comprising:
continuously capturing a live stream of images using the on board imager; and
wherein the feedback message includes an augmented reality stream of images generated using the live stream of images.

19. The computer-implemented method of claim 12, wherein:
the step of determining the characteristic quantity includes determining that the reference image is of insufficient quality, and the feedback message includes instructions to recapture the reference image.

20. The computer-implemented method of claim 12, wherein the method further comprises:
disabling a capture interface on the control device based on the characteristic quantity, and wherein the step of determining the characteristic quantity based on the reference image is conducted in real time.

21. The computer-implemented method of claim 12, further comprising:
generating a signature for a zone of interest using the reference image;
associating, with the zone of interest, one of: a communication object and a controllable object;
receiving a pointing target image from the on board imager;

identifying the signature using the pointing target image; and activating a communication interface for the communication object in response to identifying the signature.

22. The computer-implemented method of claim 12, further comprising:

determining the characteristic quantity based on the reference image and data from a motion tracker on the control device; or generating the feedback message based on the characteristic quantity and data from the motion tracker.

23. A system comprising:

a control device, wherein the control device has a pointing direction;

an onboard imager located on the control device, wherein the onboard imager has a field of view which includes the pointing direction; and one or more computer readable media storing instructions to:

receive a set of reference images indicative of a zone of interest in a physical location;

determine a characteristic quantity based on the set of reference images, the characteristic quantity being representative of distinctiveness of a signature of the zone of interest;

generate a feedback message based on the characteristic quantity, and continuously capture a live stream of images using the onboard imager, wherein the feedback message includes an augmented reality stream of images generated using the live stream of images; and based on the characteristic quantity, terminate a setup phase for the control device.

24. A system comprising:

a control device, wherein the control device has a pointing direction;

an onboard imager located on the control device, wherein the onboard imager has a field of view which includes the pointing direction;

a companion device having a companion device imager and a display; and one or more computer readable media storing instructions to:

receive a set of reference images captured by the companion device imager;

determine a characteristic quantity based on the set of reference images;

based on the characteristic quantity either: (i) generate a feedback message; or (ii) terminate a setup phase for the control device; and display the set of reference images on the display.

25. The system of claim 24, wherein:

the feedback message regards at least one additional reference image to be captured to improve the characteristic quantity.

26. The system of claim 25, wherein:

the feedback message includes instructions on how to capture the at least one additional reference image.

27. The system of claim 26, wherein:

the at least one additional reference image is captured by the companion device imager; and the instructions specify at least one position for the companion device to be in when capturing the at least one additional reference image.

28. The system of claim 23, the one or more computer readable media further storing instructions to:

generate a signature for a zone of interest using the set of reference images;

associate a communication object with the zone of interest;

receive a pointing target image from the on board imager;

identify the signature using the pointing target image; and activate a communication interface for the communication object in response to identifying the signature.

29. The system of claim 23, the system further comprising:

a motion tracker on the control device; and wherein the one or more computer readable media further stores instructions to either:

determine the characteristic quantity based on the set of reference images and data from the motion tracker; or generate the feedback message based on the characteristic quantity and data from the motion tracker.

* * * * *